(12) United States Patent
Block et al.

(10) Patent No.: US 9,153,050 B2
(45) Date of Patent: Oct. 6, 2015

(54) BOREHOLE AND WELL DATA VISUALIZATION

(71) Applicants: William T. Block, Friendswood, TX (US); John G. Evans, The Woodlands, TX (US); Peter J. Guijt, Spring, TX (US); Steven Pierce, Houston, TX (US); William W. Scott, The Woodlands, TX (US); Joel W. Tarver, Houston, TX (US); Mehran Richard Tayyab, Houston, TX (US); Doron Hetz, Houston, TX (US)

(72) Inventors: William T. Block, Friendswood, TX (US); John G. Evans, The Woodlands, TX (US); Peter J. Guijt, Spring, TX (US); Steven Pierce, Houston, TX (US); William W. Scott, The Woodlands, TX (US); Joel W. Tarver, Houston, TX (US); Mehran Richard Tayyab, Houston, TX (US); Doron Hetz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 358 days.

(21) Appl. No.: 13/659,645

(22) Filed: Oct. 24, 2012

(65) Prior Publication Data
US 2014/0111519 A1    Apr. 24, 2014

(51) Int. Cl.
*G06T 11/20* (2006.01)
*E21B 47/00* (2012.01)

(52) U.S. Cl.
CPC ........... *G06T 11/206* (2013.01); *E21B 47/0002* (2013.01)

(58) Field of Classification Search
None
See application file for complete search history.

(56) References Cited

U.S. PATENT DOCUMENTS

| 5,363,095 | A | * | 11/1994 | Normann et al. ......... 340/854.7 |
| 5,396,890 | A | * | 3/1995 | Weng ........................... 600/443 |
| 7,596,481 | B2 | | 9/2009 | Zamora et al. |
| 7,603,264 | B2 | | 10/2009 | Zamora et al. |
| 7,657,414 | B2 | | 2/2010 | Zamora et al. |

(Continued)

OTHER PUBLICATIONS

Jelescu, "3D Tunnels in AE using FreeForm Pro", available online @ https://library.creativecow.net/jelescu_tudor/AE-3D-tunnels-FreeForm-Pro-1/1 since 2011.*
LogPlot, downloaded @ http://web.archive.org/web/20080822231039/http://www.rockware.com/product/overviewSection.php?id=176&section=43, available since Aug. 2008.*
Chapman et al., "Meeting the Challenges of Oilfield Exploration Using Intelligent Micro and Nano-Scale Sensors", 2012 12the IEEE International Conference on Nanotechnology, Aug. 20-23, 2012, pp. 1-6.

(Continued)

*Primary Examiner* — Yingchun He
(74) *Attorney, Agent, or Firm* — Cantor Colburn LLP

(57) ABSTRACT

A visualization system for visualizing data obtained in a borehole includes a processor configured to process the data based on user input and instructions and provide output for display on a display device. The system may also include a computer-readable medium configured to store the instructions, the instructions including commands to output values of two or more types of parameters at two or more depth values. The instructions may include commands to provide a perspective top-down or bottom-up fly-through display of the borehole including a zoomed-in image of values closest to a user. The processor may also output a display of a photographic image at each of the two or more depth values based on a correspondence between the values of the two or more types of parameters and the plurality of parameters associated with the photographic image.

10 Claims, 8 Drawing Sheets

(56) References Cited

U.S. PATENT DOCUMENTS

| | | | |
|---|---|---|---|
| 2004/0210392 A1* | 10/2004 | Fleury et al. | 702/6 |
| 2007/0156340 A1* | 7/2007 | Shray et al. | 702/11 |
| 2009/0110242 A1* | 4/2009 | Touati et al. | 382/109 |
| 2009/0193353 A1* | 7/2009 | Sharp et al. | 715/784 |
| 2011/0175899 A1* | 7/2011 | Bittar et al. | 345/419 |

OTHER PUBLICATIONS

Han et al., "Research on Downhole Multi-parameters Monitoring System", IEEE, Aug. 2012, pp. 1-4.

ip.com Journal, "IP Solutions with a Higher IQ", Mar. 2013, vol. 13, No. 38, pp. 1-3.

* cited by examiner

BOREHOLE AND WELL DATA VISUALIZATION

BACKGROUND

During the process of drilling a well to explore and recover geologic resources, many measurements may be taken to determine conditions within the borehole and in the formation. Analysis of this data can make the drilling process more efficient and can provide insight into the potential productivity of a well. Although large volumes of data are collected, the data sets are currently not organized and visualized in a meaningful way. Thus, a high level of experience and expertise is required to ascertain meaningful information without lengthy additional processing. Consequently, techniques to improve the visualization of collected data would be appreciated in the drilling industry.

BRIEF SUMMARY

According to one embodiment, a visualization system for visualizing data obtained in a borehole includes a processor configured to process the data based on user input and instructions and provide output for display on a display device; and a computer-readable medium configured to store the instructions, the instructions including commands to output values of two or more types of parameters at two or more depth values.

According to another embodiment, a visualization system for visualizing data obtained in a borehole includes a processor configured to process the data based on user input and instructions and provide output for display on a display device; and a computer-readable medium configured to store the instructions, the instructions including commands to provide a perspective top-down or bottom-up fly-through display of the borehole including a zoomed-in image of values closest to a user.

According to yet another embodiment, a visualization system includes a database comprising photographic images of a plurality of rocks, each photographic image associated with a plurality of parameters; and a processor configured to process data obtained in a borehole at a plurality of depth values and display a photographic image at each depth value based on a correspondence between a value of the data at the depth value and one or more of the parameters associated with the photographic image.

BRIEF DESCRIPTION OF THE DRAWINGS

Referring now to the drawings wherein like elements are numbered alike in the several Figures.

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
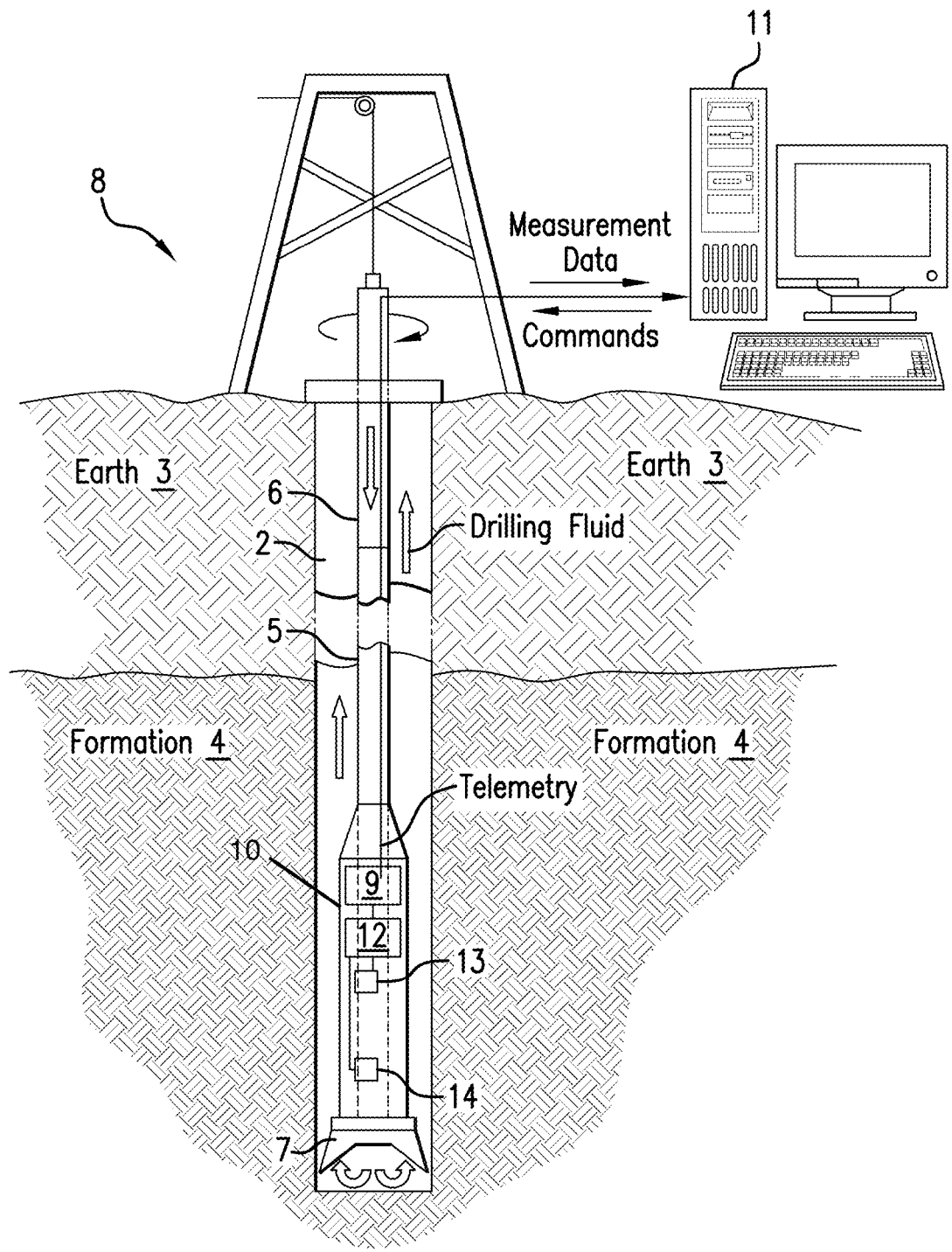
FIG. 1 illustrates a cross-sectional view of an exemplary embodiment of downhole tools disposed in a borehole penetrating the earth.

FIG. 1 illustrates a cross-sectional view of an exemplary embodiment of downhole tools 10 disposed in a borehole 2 penetrating the earth 3. The formation 4 represents any subsurface material of interest. The downhole tools 10 are conveyed through the borehole 2 by a carrier 5. In the exemplary embodiment shown by FIG. 1, the carrier 5 is a drill string 6 in an embodiment known as logging-while-drilling (LWD). Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. In alternate embodiments, the carrier 5 may be an armored wireline in an embodiment known as wireline logging. In either case, the downhole tools 10 measure various parameters that may be processed by downhole electronics 9. The measured data may instead or additionally be processed by a computer processing system 11 disposed at the surface of the earth 3. The computer processing system 11 may process recorded data in a post-processing environment or data may be transmitted to the computer processing system 11 via a telemetry interface while the downhole tools 10 are collecting measurements. In alternate embodiments, the computer processing system 11 may issue commands regarding the drilling process, further measurements and the like based on the data that is receives. The downhole tools 10 may record electrical, radioactive, magnetic, and other properties at different depths. Exemplary downhole tools 10 include a pressure transducer 12, temperature sensor 13, and magnetic resonance imaging tool 14. It should be understood that the downhole tools 10 could also include any number of sensors and measurement devices that work alone or in combination with each other.

Figure 2:
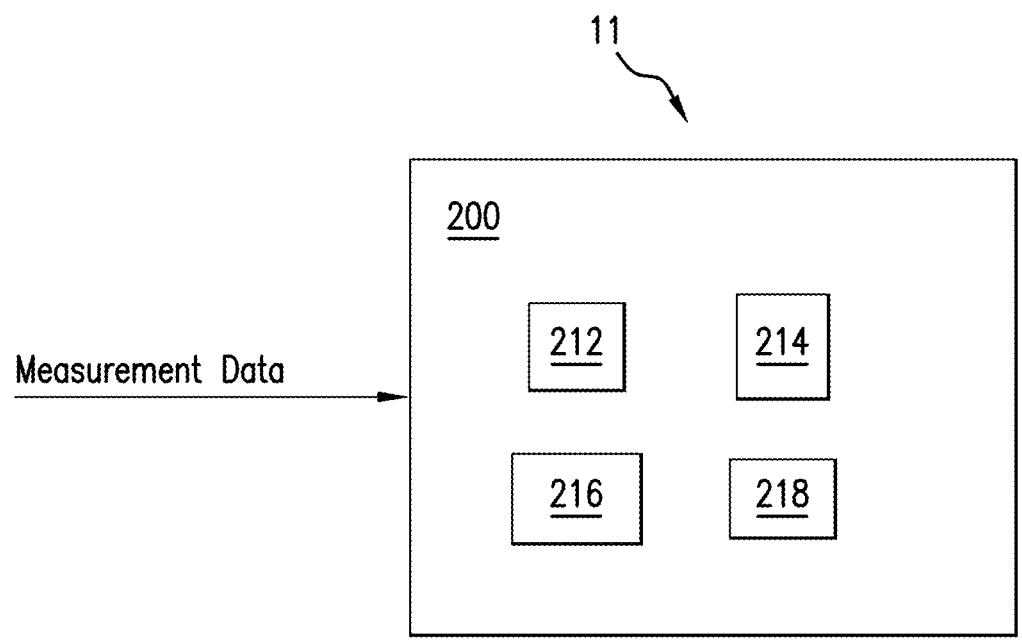
FIG. 2 is a block diagram of an exemplary data visualization system according to an embodiment of the invention.

FIG. 2 is a block diagram of an exemplary data visualization system 200 according to an embodiment of the invention. The data visualization system 200 includes one or more memory devices 212, one or more processors 214, a user interface 216, and a display device 218. In one or more embodiments, the data visualization system is the computer processing system 11 shown at FIG. 1. The one or more memory devices 212 and one or more processors 214 communicate with each other and with the other parts of the data visualization system 200 wirelessly or via one or more buses. As such, the different parts 212, 214, 216, and 218 may not be housed together but, instead, for example, the processor 214 may transmit processed data to the display device 218 over a network for display at a different location. The one or more memory devices 212 store one or more applications that, when executed by the processor 214, process the incoming measurement data and provide output in a format for display by the display device 218. Each of the different types of applications is detailed below.

Figure 3:
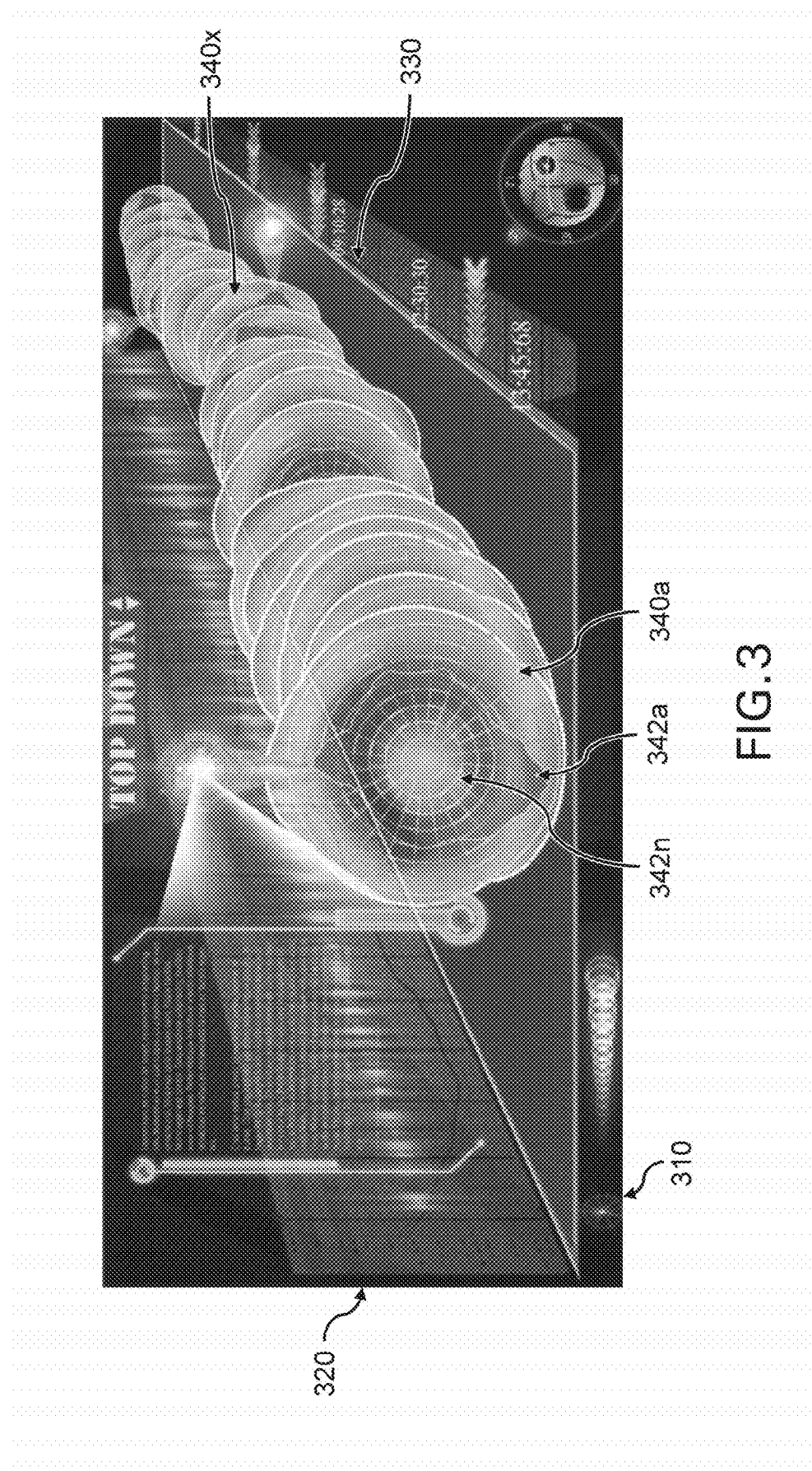
FIG. 3 illustrates an output of the data visualization system according to an embodiment of the invention.

FIG. 3 illustrates an output of the data visualization system 200 according to an embodiment of the invention. As FIG. 3 shows, data at different depths is visualized as slices 340 along the z axis 330 (deeper slices being farther away on the z axis 330 based on the perspective shown by FIG. 3). Data at any given depth (each slice 340) is displayed in the x (310)-y (320) plane as an approximately circular shape that substantially matches the shape of the borehole 2. A given slice 340 is comprised on concentric rings 342, and each ring 342 represents values for a different type of parameter at the corresponding given depth. Each different parameter may be color-coded to indicate value, as shown at FIG. 3. In alternate embodiments, each different parameter may be texture-coded or both color and texture-coded. For example, the concentric rings 342 may provide information regarding density 342$a$ and a gamma reading 342$n$. In another embodiment, only one parameter may be displayed at each depth. If that parameter were constant over the circumference at each given depth, then each slice 340 would have a constant color (or texture or both, based on the embodiment). For example, if each slice 340 represented density at a given depth, each slide would be a single color that represented density for the given depth, though each slice 340 would likely not be the same color as every other slice 340 unless the density were constant over the depth of the borehole. Because the slices 340 are offset from each other along the z axis 330 as shown at FIG. 3, rather than being aligned as in a cylinder, some part of each slice 340 is visible and available for selection by a user. As a result of the offset, a portion of slice 340$x$ is still visible and can be selected by a user for a more detailed study. In alternate embodiments, the z axis 330 may represent time rather than depth. Also, in alternate embodiments, a photographic image rather than measurement data may be shown by each slice 340 at each depth or time interval on the z axis 330.

Figure 4:
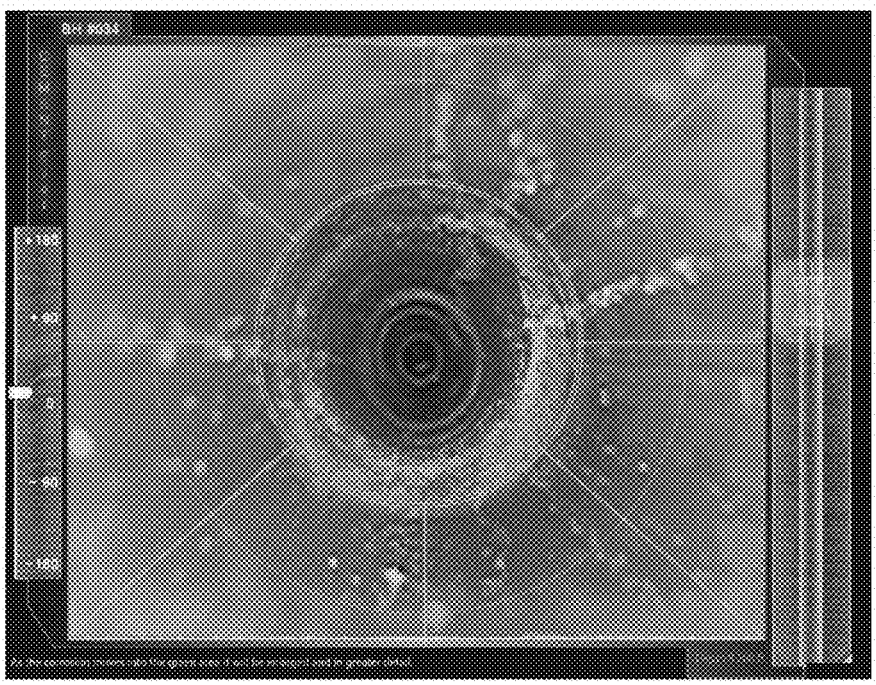
FIGS. 4 and 5 illustrate an output of the data visualization system according to another embodiment of the invention.
Figure 5:

FIGS. 4 and 5 illustrate an output of the data visualization system 200 according to another embodiment of the invention. FIG. 4 shows a top-level image 410 of a fly through visualization mode. The exemplary image 410 shown in FIG. 4 is photographic, but data-generated images 410 may be used in this embodiment, as well. For example, a high resolution vertilog or other type of measurement-generated image may be used. Additionally, while the exemplary borehole 2 of FIG. 4 does not include a casing, images 410 (photographic or data-generated) of a borehole 2 casing may be used. Thus, the condition of the casing may be inspected through the output of this embodiment. In the fly through mode, a user operates a pointer or other guide of the user interface 216 shown on the display device 218 to move top-down or bottom-up through a borehole 2. In alternate embodiments, the "fly through" may be performed automatically at a preset speed. FIG. 5 shows that, at each depth during the visual "flight" through the borehole 2, the data (image 410) at the current depth is shown in greater detail. This greater detail may be referred to as a balloon view 510.

Figure 6:
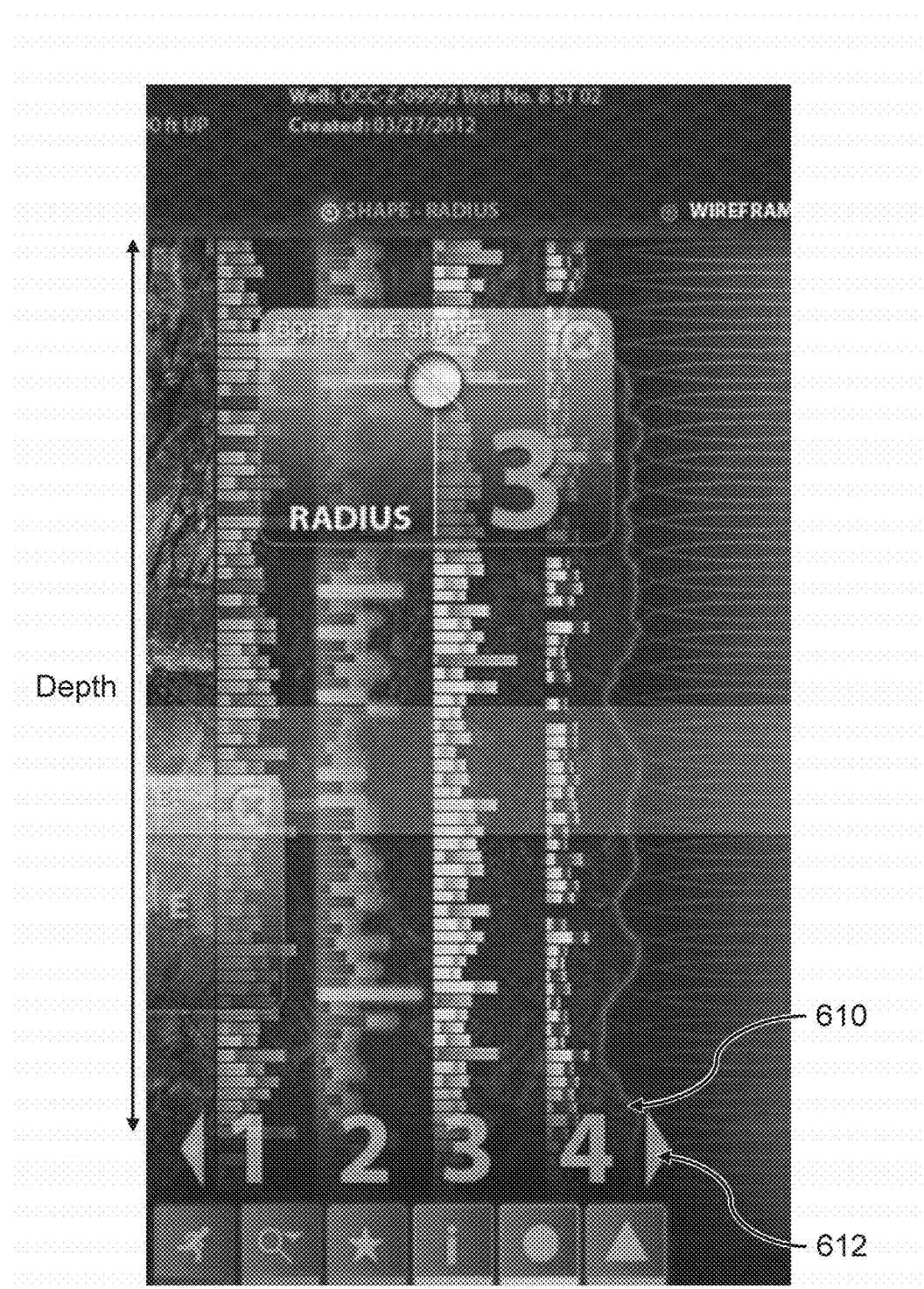
FIG. 6 illustrates an output of the data visualization system according to yet another embodiment of the invention.

FIG. 6 illustrates an output of the data visualization system 200 according to yet another embodiment of the invention. Although the values of each parameter 610 are shown in column format at FIG. 6, the values of each parameter 610 may form a row in the display instead. The user interface 216 allows a user to step through data sets such that values at every depth are shown for some number of parameters 610 at a time. The stepping through may be in a scrolling or conveyer-belt type of fashion. For example, in the exemplary display of FIG. 6, the parameter 610 identified by "1" may be removed from the display by the user selecting the right arrow 612, and another parameter 610 identified by "5" may be displayed as the right-most parameter 610 in the display. The number of parameters 610 displayed at one time may be adjusted by the user by adjusting a size of the display device 218 screen. The parameters 610 may be identified by names or other identifiers. In the embodiment shown at FIG. 6, each parameter 610 is numbered. The user may select one particular parameter 610 for a more detailed view based on the step-through preview.

Figure 7:
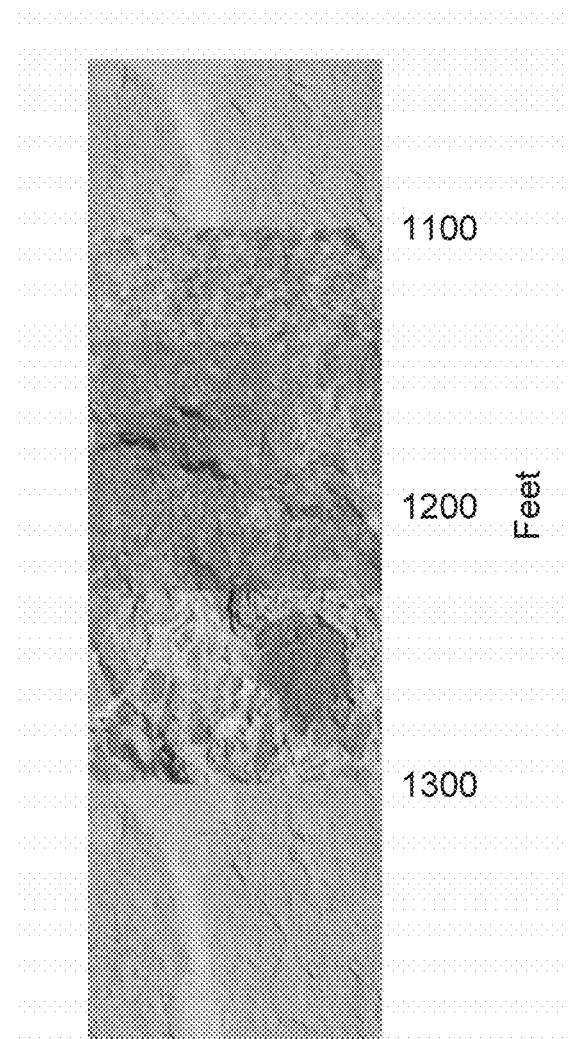
FIG. 7 illustrates an output of the data visualization system according to an embodiment of the invention.

FIG. 7 illustrates an output of the data visualization system 200 according to an embodiment of the invention. The one or more memory devices 212 of the data visualization system 200 store a catalog of photographs of rocks. Based on data collected in the borehole at different depths, the processor 214 associates each depth with a type of rock from the stored catalog and displays an image of the corresponding rock photographs at each depth.

Figure 8:
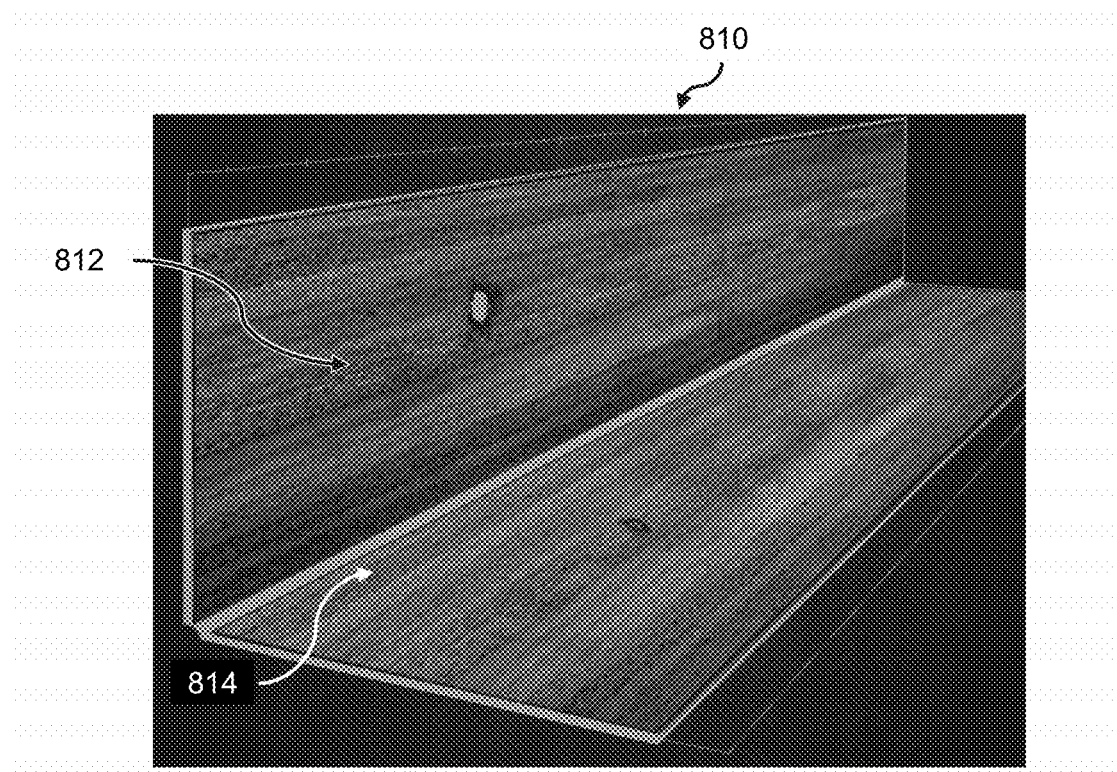
FIGS. 8-11 illustrate outputs of the data visualization system according to an embodiment of the invention.
Figure 9:
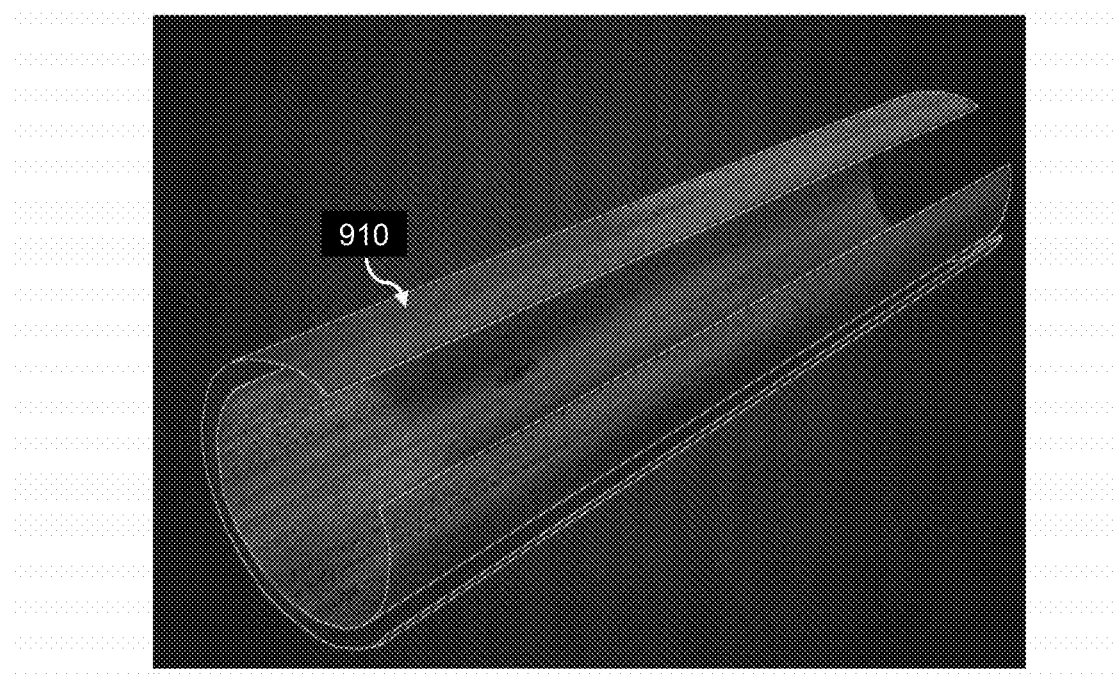
Figure 10:
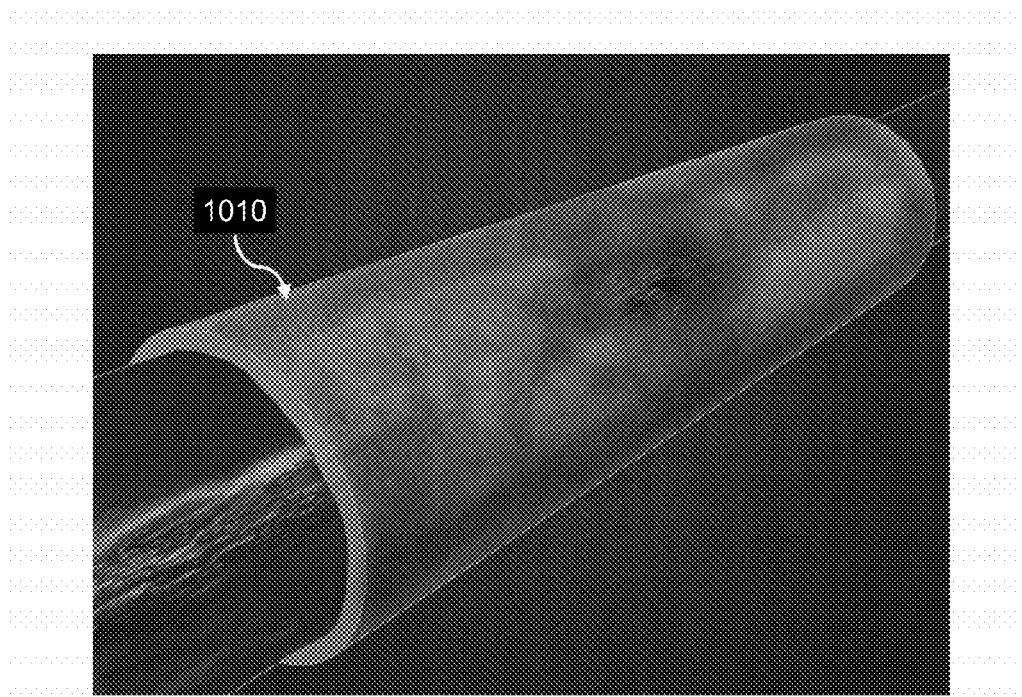
Figure 11:
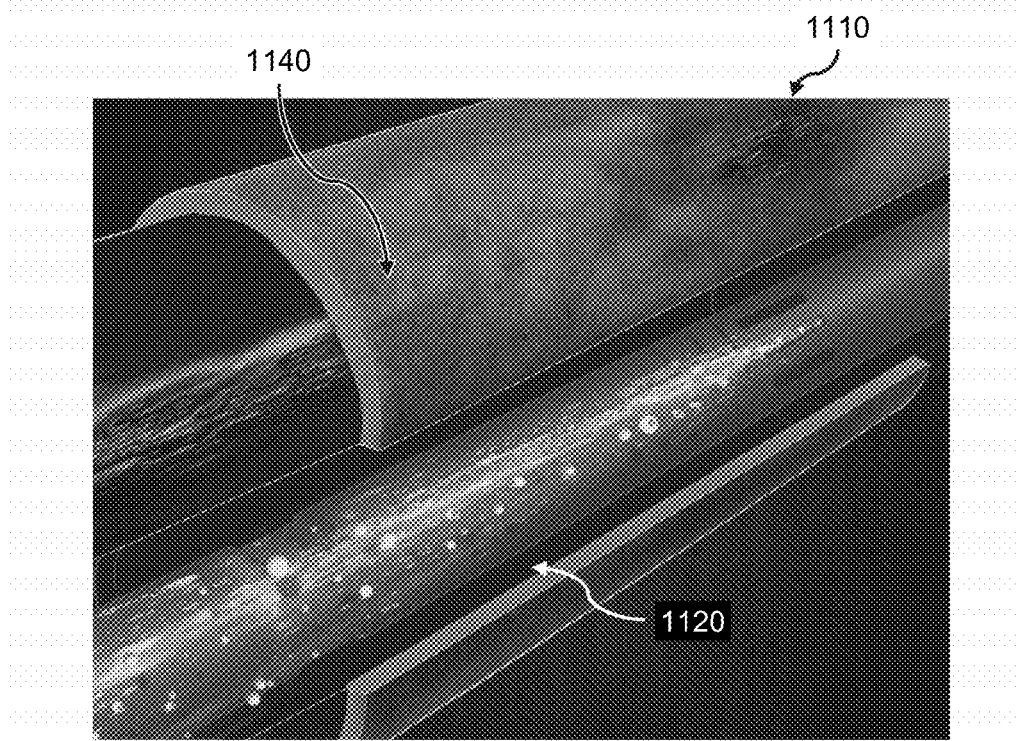

FIGS. 8-11 illustrate outputs of the data visualization system 200 according to an embodiment of the invention. According to the present embodiment, a series of images is generated by the processor 214 for display on the display device 218 as a moving picture. The series of images can be thought to "roll up" a two-dimensional image of inner and outer borehole 2 properties at a range of depths into a three-dimensional image. Any parameter types may be displayed and "rolled up," and, in fact, more than two parameter types may be used in the series of images. However, as FIGS. 8-11 show, when two parameter types representing inner and outer borehole 2 parameters are used, the series of images results in a realistic real-world image that is intuitively understandable to a user. The exemplary embodiment of FIGS. 8-11 includes a cased borehole 2 such that a reference to the inner and outer borehole 2 is a reference to the inner and outer casing in the example. Initially, as shown at FIG. 8, parameter values from inner and outer borehole 2 measurements are shown in orthogonal planar view 810. That is, one type of parameter (e.g., temperature, or any other parameter that may be associated with "inner" borehole) is shown on one plane 812 and another type of parameter (e.g., porosity, density, or any other parameter that may be associated with "outer" borehole) is shown on another plane 814, orthogonal to the first. The orthogonal planar view 810 of FIG. 8 is rolled up into a partially closed three-dimensional cylinder 910 as shown at FIG. 9. In the partially closed three-dimensional cylinder 910, some portion of the inner type of parameter is visible and some of the outer type of parameter, encompassing the inner type of parameter is also visible. As shown at FIG. 10, the three-dimensional cylinder 910 (FIG. 9) is completely closed into a closed cylinder 1010 so that only one (the outer) of the two types of parameters is visible, with the inner type of parameter being hidden from view inside the closed cylinder 1010. In the exemplary image shown at FIG. 10, borehole fluid is shown flowing through the closed cylinder 1010 to enhance the realistic effect of the image. As shown at FIG. 11, the series of images includes a cut-away image 1110 of the closed cylinder 1010 revealing a portion of the inner parameter 1120 and a portion of the outer parameter 1140. While a single cut along the axial length of the closed cylinder 1010 is shown to generate the cut-away image 1110 in FIG. 11, in alternate embodiments, the closed cylinder 1010 may be cut into any number of segments such that each of the segments is pulled apart and displayed. The series of images may be an especially helpful visualization tool for those who have limited experience with drilling environments.

While one or more embodiments have been shown and described, modifications and substitutions may be made thereto without departing from the spirit and scope of the invention. Accordingly, it is to be understood that the present invention has been described by way of illustrations and not limitation.

In support of the teachings herein, various analysis components may be used, including a digital and/or an analog system. For example, the downhole electronics 9 or the computer processing system 11 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A visualization system for visualizing data obtained in a borehole, comprising:
a processor configured to process the data based on user input and instructions and provide output for display on a display device; and
a computer-readable medium configured to store the instructions, the instructions including commands to output values of two or more types of parameters at two or more depth values in the borehole, wherein the processor outputs a series of images for successive display, a first of the series of images including values of one of the two or more types of parameters being displayed in a plane that is orthogonal to a plane that displays values of another of the two or more types of parameters.

2. The system according to claim 1, wherein the processor additionally outputs values of the two or more types of parameters at each of the two or more depth values for display as a set of concentric rings with each of the concentric rings representing values of one of the two or more types of parameters.

3. The system according to claim 2, wherein the processor arranges each of the sets of concentric rings at each of the two or more depth values such that a center of each of the sets of concentric rings at each of the two more depth values is offset from a center of adjacent ones of the sets of concentric rings along an axis representing depth.

4. The system according to claim 3, wherein at least a portion of each of the sets of concentric rings is visible in the display and the processor displays greater detail of the values of the two or more types of parameters at a user-selected depth.

5. The system according to claim 1, wherein the display device displays the values of at least two of the two or more types of parameters at each of the two or more depth values in a row or column format.

6. The system according to claim 5, wherein, automatically at a preset rate or based on the user input, the processor removes at least one of the at least two of the two or more types of parameters displayed in the row or column format from the display device and instead outputs for display another one of the at least two or more types of parameters in a scrolling fashion.

7. The system according to claim 1, further comprising a database comprising photographic images of a plurality of rocks, each photographic image associated with a plurality of parameter values, wherein the processor further processes the values of the two or more types of parameters at the two or more depth values and outputs a display of a photographic image at each of the two or more depth values based on a correspondence between the values of the two or more types of parameters and the plurality of parameters associated with the photographic image.

8. The system according to claim 1, wherein the one of the two or more types of parameters represents data of an inner borehole and the another of the two or more types of parameters represents data of an outer borehole, and another of the series of images includes rolling up the first of the series of images into a partially open cylinder such that a portion of the one of the two or more types of parameters is visible and encompassed by the another of the two or more types of parameters.

9. The system according to claim 8, wherein the series of images includes a closed cylinder generated by closing the partially open cylinder such that the one of the two or more types of parameters is not visible.

10. The system according to claim 9, wherein the series of images includes a cut-away image generated by cutting the closed cylinder into two or more segments and separating the two or more segments such that a portion of each of the one and the another of the two or more types of parameters is visible.

* * * * *